(12) United States Patent  
Nath et al.

(10) Patent No.: US 6,654,190 B2
(45) Date of Patent: Nov. 25, 2003

(54) FLEXIBLE AIR BEARING DESIGN SYSTEM WITH INDEPENDENT PROFILE MAPPING AND HEIGHT FIELD DEFINITION FOR MASK TIERS

(75) Inventors: Bijoyendra Nath, Minneapolis, MN (US); Yu-Li Chang, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 232 days.

(21) Appl. No.: 09/866,386

(22) Filed: May 25, 2001

(65) Prior Publication Data

US 2002/0034034 A1 Mar. 21, 2002

Related U.S. Application Data

(60) Provisional application No. 60/207,466, filed on May 25, 2000.

(51) Int. Cl.$^7$ .............................................. G11B 27/36
(52) U.S. Cl. ...................... 360/31; 360/55; 360/78.09; 360/234; 703/7
(58) Field of Search ................... 360/31, 55, 78.09, 360/230, 234, 235.4; 703/6, 7, 3, 5; 324/210, 212, 226; 702/104

(56) References Cited

U.S. PATENT DOCUMENTS

| | | | | |
|---|---|---|---|---|
| 5,742,451 A | * | 4/1998 | Kubota | 360/236.7 |
| 5,995,324 A | | 11/1999 | Haddock et al. | |
| 6,255,621 B1 | * | 7/2001 | Lundquinst | 219/121.72 |
| 6,546,355 B2 | * | 4/2003 | Matsushita | 702/152 |
| 6,546,362 B1 | * | 4/2003 | Guo | 703/1 |

* cited by examiner

*Primary Examiner*—Alan T. Faber
(74) *Attorney, Agent, or Firm*—Westman, Champlin & Kelly, P.A.

(57) ABSTRACT

A system for modeling air bearing designs for heads of a data storage system The modeling system includes user definable surface contours for mask surfaces. The system generates integrated surface functions for the mask surfaces based upon the user defined mask surface contours. The system includes a user definable depth dimension for the mask surface functions and the integrated mask surface functions and dimension parameter for the mask surfaces are compiled to simulate a modeled air bearing structure for performance analysis and evaluation. The integrated mask surface functions are used to define the multiple mask tiers for slider fabrication.

20 Claims, 11 Drawing Sheets

FLEXIBLE AIR BEARING DESIGN SYSTEM WITH INDEPENDENT PROFILE MAPPING AND HEIGHT FIELD DEFINITION FOR MASK TIERS

CROSS-REFERENCE TO RELATED APPLICATION

This application claims priority to Provisional Application Ser. No. 60/207,466 filed May 25, 2000 entitled "AUTOMATIC HEIGHT FIELD DEFINITION USING UNSTRUCTURED GRIDS FOR ADVANCED AIR BEARINGS".

FIELD OF THE INVENTION

The present invention relates to data storage systems. In particular, the present invention relates to systems and methods for design and fabrication of air bearing sliders for data storage devices.

BACKGROUND OF THE INVENTION

Data storage devices store digital information on discs. Heads are supported relative to disc surfaces to read data from or write data to the discs. Heads include transducer elements which are supported on an air bearing slider. The air bearing slider includes a leading edge, a trailing edge and offset or raised bearing surfaces. Rotation of the discs of the data storage devices creates an air flow along the raised bearing surfaces of the air bearing slider from the leading to the trailing edge of the air bearing slider. Air flow along the raised bearing surfaces of the air bearing slider imparts a hydrodynamic force to support the slider above the disc surface for read/write operations.

Areal disc drive density is increasing requiring more control over dynamic operating parameters or design of the air bearing slider. Modeling techniques are used to analyze dynamic operating parameters for various air bearing designs. Modeling techniques analyze fly height, pitch, roll, altitude, sensitivity or other parameters for a particular air bearing design. Optimization of an air bearing design may take several design iterations. Prior modeling techniques are not well adapted to analyze operating parameters for multiple iterations of air bearing designs.

Raised bearing surfaces of an air bearing slider are fabricated by known masking and etching processes. Multiple tiered bearing surfaces are fabricated by multiple masking steps to form multiple offset or raised bearing surfaces. Multiple mask profiles are calculated or derived for each mask tier of the modeled bearing surface design to define mask surfaces for each mask tier. Calculation or derivation of the mask profiles and mask surfaces for each mask tier for the modeled air bearing design is time consuming and labor intensive. The present invention addresses these and other problems and offers solutions not recognized nor appreciated by the prior art.

SUMMARY OF THE INVENTION

The present invention relates to a system for modeling air bearing designs for heads of a data storage system. The modeling system includes user definable surface contours for mask surfaces. The system generates integrated surface functions for the mask surfaces based upon the user defined mask surface contours. The system includes user definable height or depth variables for the mask surface functions and the integrated surface functions and height or depth parameters for the mask surfaces are compiled to simulate a modeled air bearing structure for performance evaluation and analysis. The modeled mask surface functions and user defined height or depth parameters define mask tiers for slider fabrication of the modeled bearing structure. These and other features as well as advantages which characterize the present invention will be apparent upon reading of the following detailed description and review of the associated drawings.

BRIEF DESCRIPTION OF THE DRAWINGS

FIG. 5-1 is a plan view of a first mask tier for the slider embodiment illustrated in FIG. 3.

FIG. 5-2 is a cross-sectional view taken along line 5-2–5-2 of FIG. 5-1.

FIG. 5-3 is a plan view of a second mask tier for the slider embodiment illustrated in FIG. 3.

FIG. 5-4 is a cross-sectional view taken along line 5-4–5-4 of FIG. 5-3.

FIG. 9-1 is a schematic illustration of the modeled air bearing structure compiled from the multi-mask tier profiles illustrated in FIG. 8.

FIG. 9-2 is a cross-sectional view taken along line 9-2–9-2 of FIG. 9-1.

DETAILED DESCRIPTION OF ILLUSTRATIVE EMBODIMENTS

Figure 1:
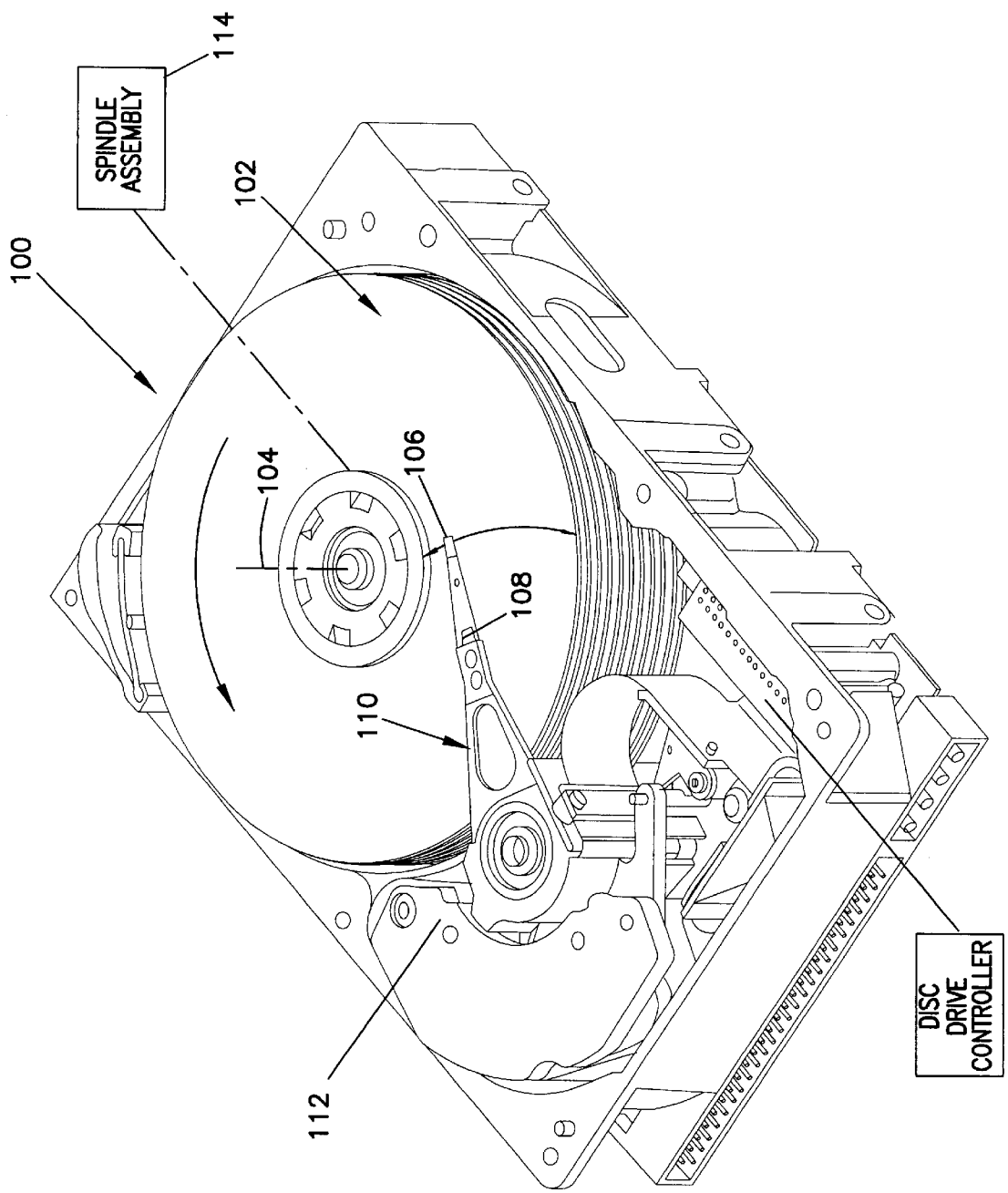
FIG. 1 is a perspective illustration of an embodiment of a data storage device.

FIG. 1 illustrates an embodiment of a data storage device 100 including a plurality of discs 102 supported for co-rotation about axis 104. Heads 106 are flexibly supported relative to surfaces of discs 102 by suspension assemblies 108 to read data from or write data to discs 102. A plurality of suspension assemblies 108 are coupled to an actuator assembly 110 which is powered by a voice coil motor 112 to position heads 106 relative to selected data tracks on the disc surface. Discs 102 are rotated by a spindle assembly 114 illustrated schematically in FIG. 1 for read-write operations.

Figure 2:
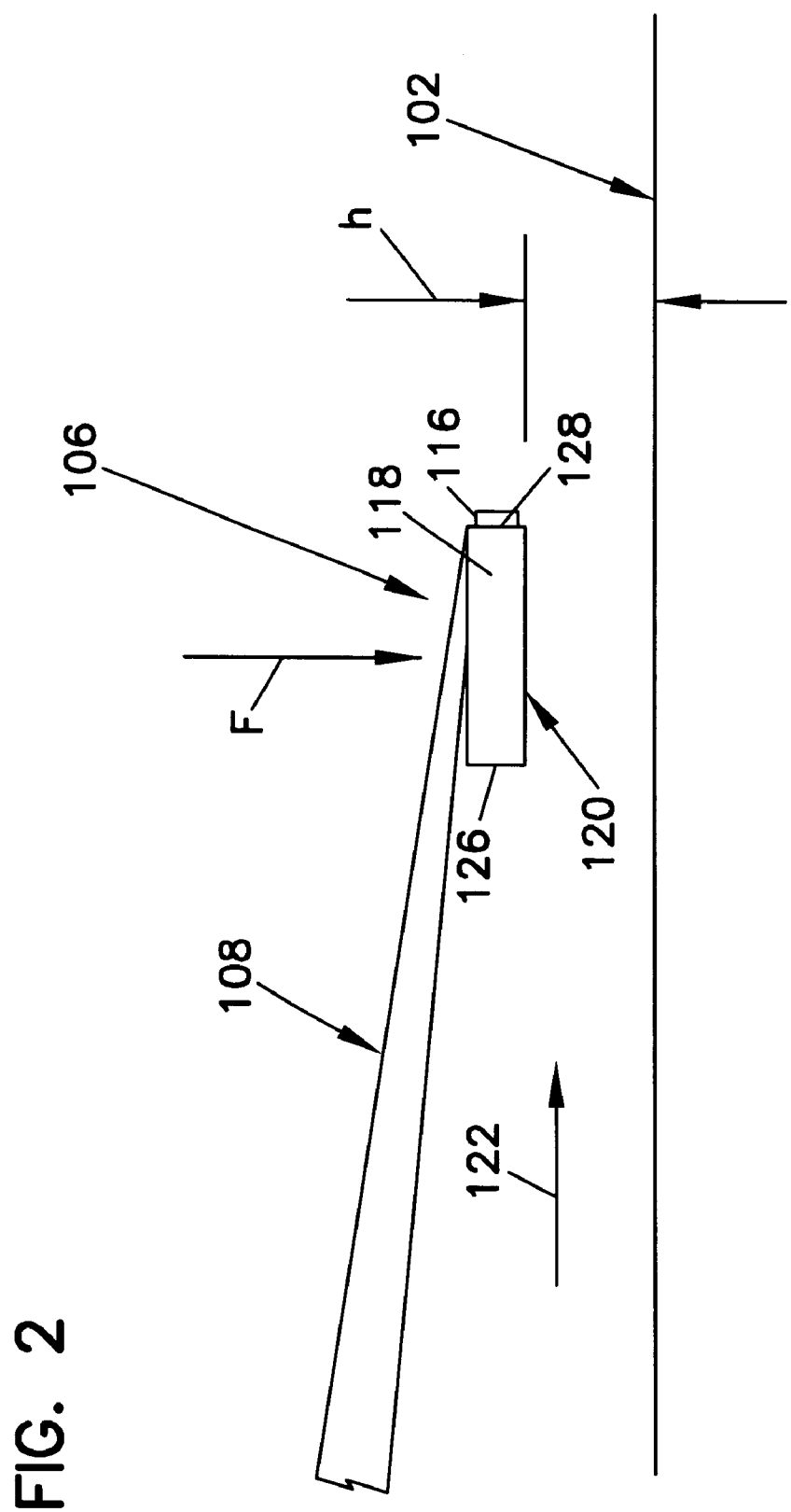
FIG. 2 is a schematic illustration of a head of a data storage device supported relative to a disc surface by a suspension assembly.

As shown in FIG. 2, heads 106 include at least one transducer element 116 (illustrated diagrammatically) supported on an air bearing slider 118 having an air bearing surface 120. The at least one transducer element 116 can be an inductive type transducer, magnetoresistive or magnetooptical transducer. For operation, rotation of discs 102 provides an air flow as illustrated by arrow 122 along the air bearing surface 120, from a leading edge 126 to a trailing edge 128 of the slider 118. Air flow along the air bearing surface 120 provides a hydrodynamic lift force so that the slider flies above the disc surface at a fly height h for read-write operations. The hydrodynamic lifting force of the air bearing surface 120 is opposed by a pre-load force F supplied by the suspension assembly 108. During operation the slider 118 is flexibly supported to pitch and roll about a gimbal point to follow the topography of the disc surface.

Figure 3:
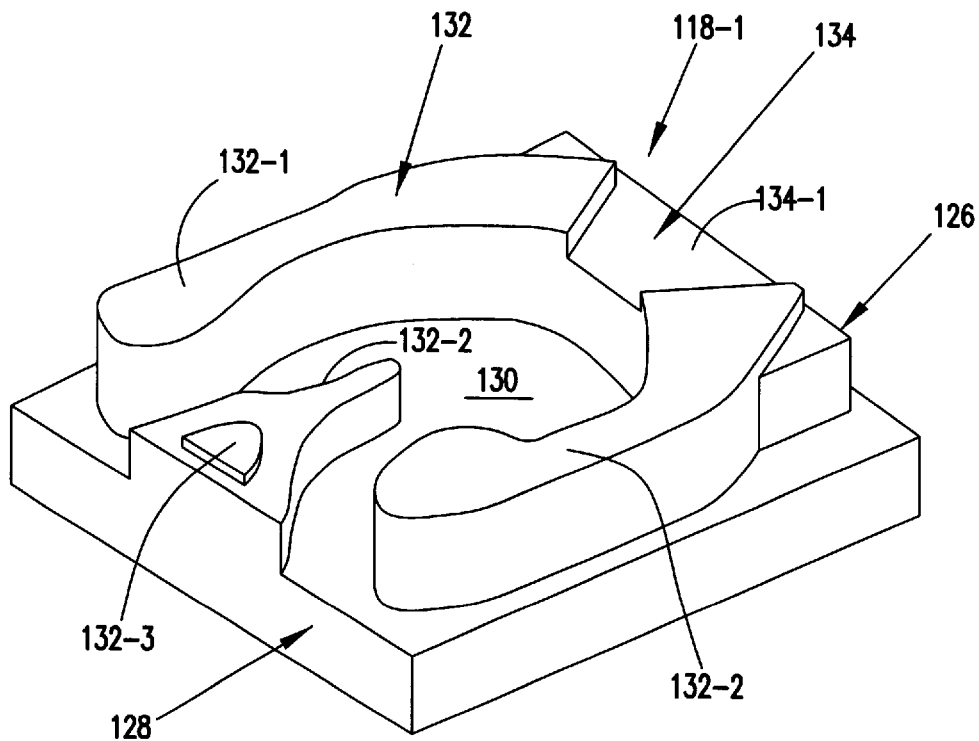
FIG. 3 is a perspective illustration of an embodiment of a multi-tiered bearing structure.
Figure 4:
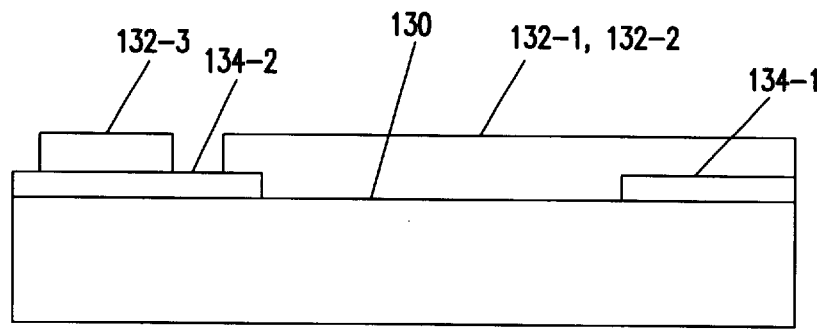
FIG. 4 is a side elevational view of the multi-tiered bearing structure embodiment illustrated in FIG. 3.

FIGS. 3–4 illustrate an embodiment of an air bearing surface for an air bearing slider 118-1 where like numbers are used to identify like parts in the previous FIGS. In the illustrated embodiment, the air bearing surface includes raised surface tiers above recessed surface 130. The raised surface tiers include elevated bearing surfaces 132 and stepped bearing surfaces 134 offset from the elevated bearing surfaces 132. In the illustrated embodiment, the elevated bearing surfaces 132 includes opposed side rails 132-1, 132-2 and a center pad 132-3. The stepped bearing surfaces includes a leading edge step 134-1 offset from the elevated bearing surfaces 132-1, 132-2 and a trailing edge stepped bearing surface 134-2 offset from elevated bearing surface 132-3. The stepped bearing surfaces 134 provide an intermediate pressure step for the raised side rails 132-1, 132-2 and center pad 132-3 for desired hydrodynamic performance.

Figures 1, 5:
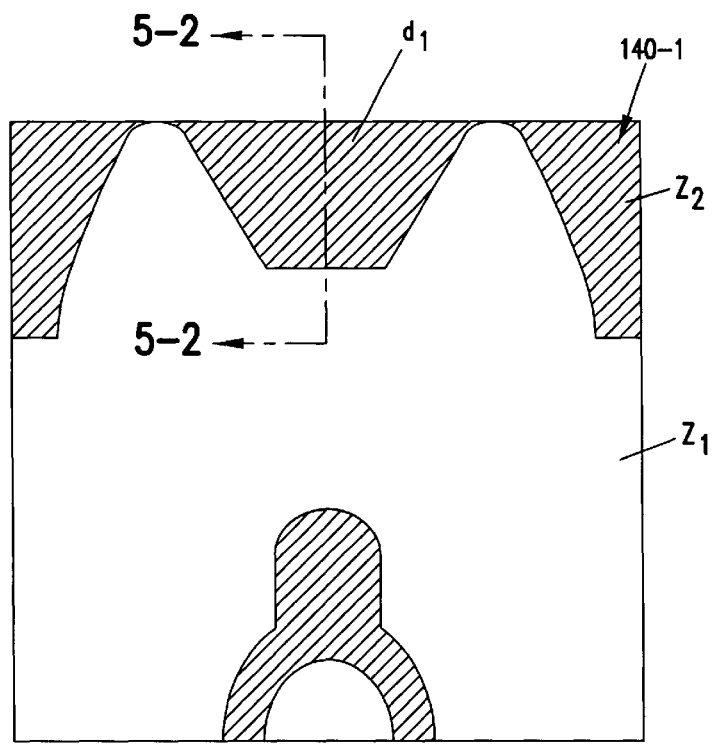
Figures 3, 5:
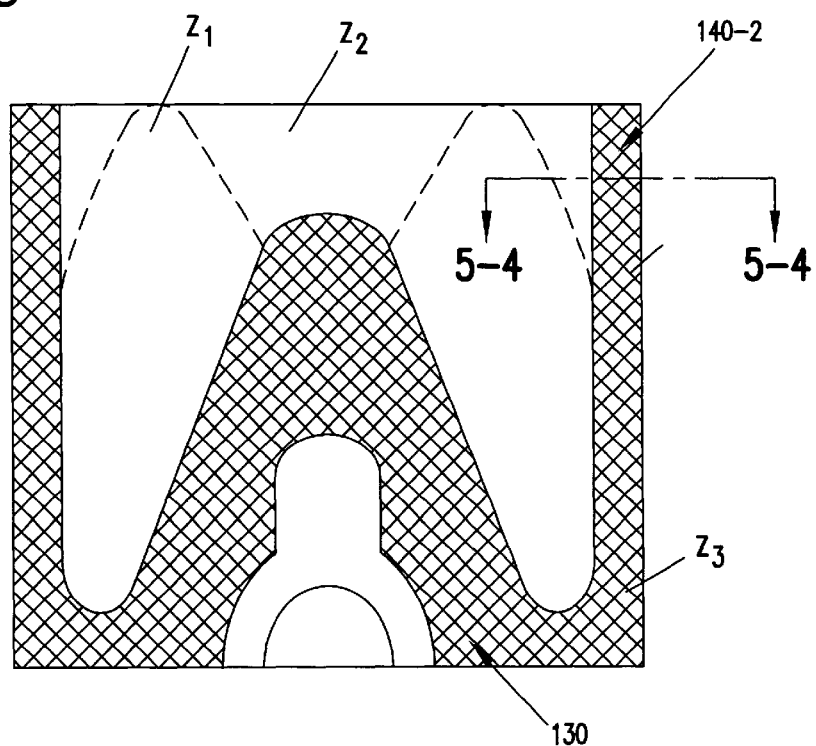
Figures 2, 5:
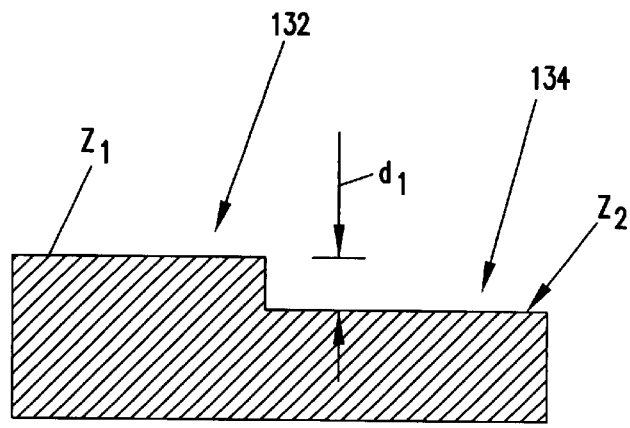
Figures 4, 5:
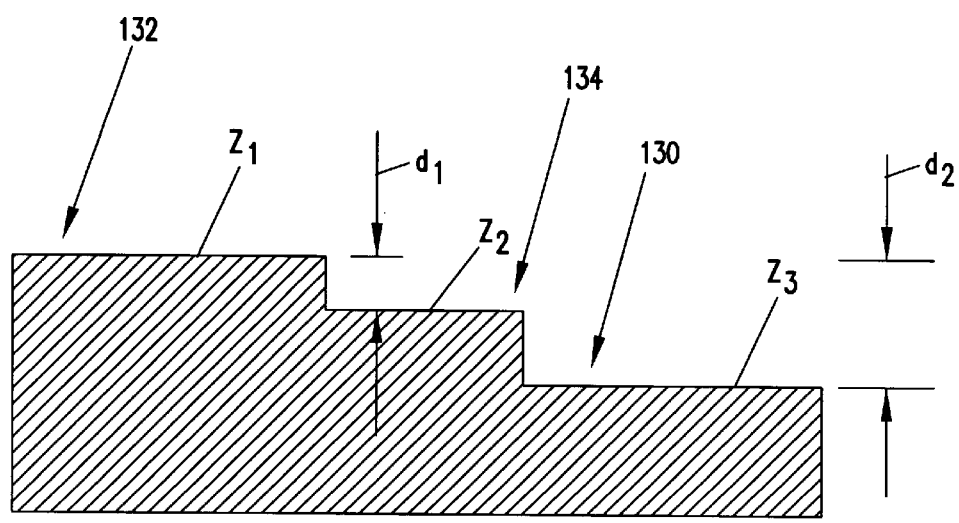

Sliders are fabricated by a wafer fabrication process. As cooperatively illustrated in FIGS. 5-1 through 5-4, the multiple bearing surface tiers of the illustrated embodiment are formed by a multiple-step masking process. The multi-step masking process includes multiple mask tiers. In the illustrated embodiment, a first mask tier 140-1 illustrated in FIGS. 5-1 through 5-2 forms stepped bearing surfaces 134 offset a distance d, from an upper substrate surface which forms the raised bearing surfaces 132 at elevation $z_1$. The offset bearing surfaces 134 are at a recessed elevation $z_2$ as cooperatively illustrated in FIG. 5-2. A second mask tier 140-2 illustrated in FIGS. 5-3 through 5-4 forms recessed bearing surface 130 at an elevation $z_3$ which is recessed a distance $d_2$ from raised bearing surface 132 or upper substrate surface at elevation $z_1$ as illustrated in FIG. 5-4. The multi-mask tiers 140-1, 140-2 cooperatively form the multi-tiered bearing structure illustrated in FIGS. 3–4.

Figure 6:
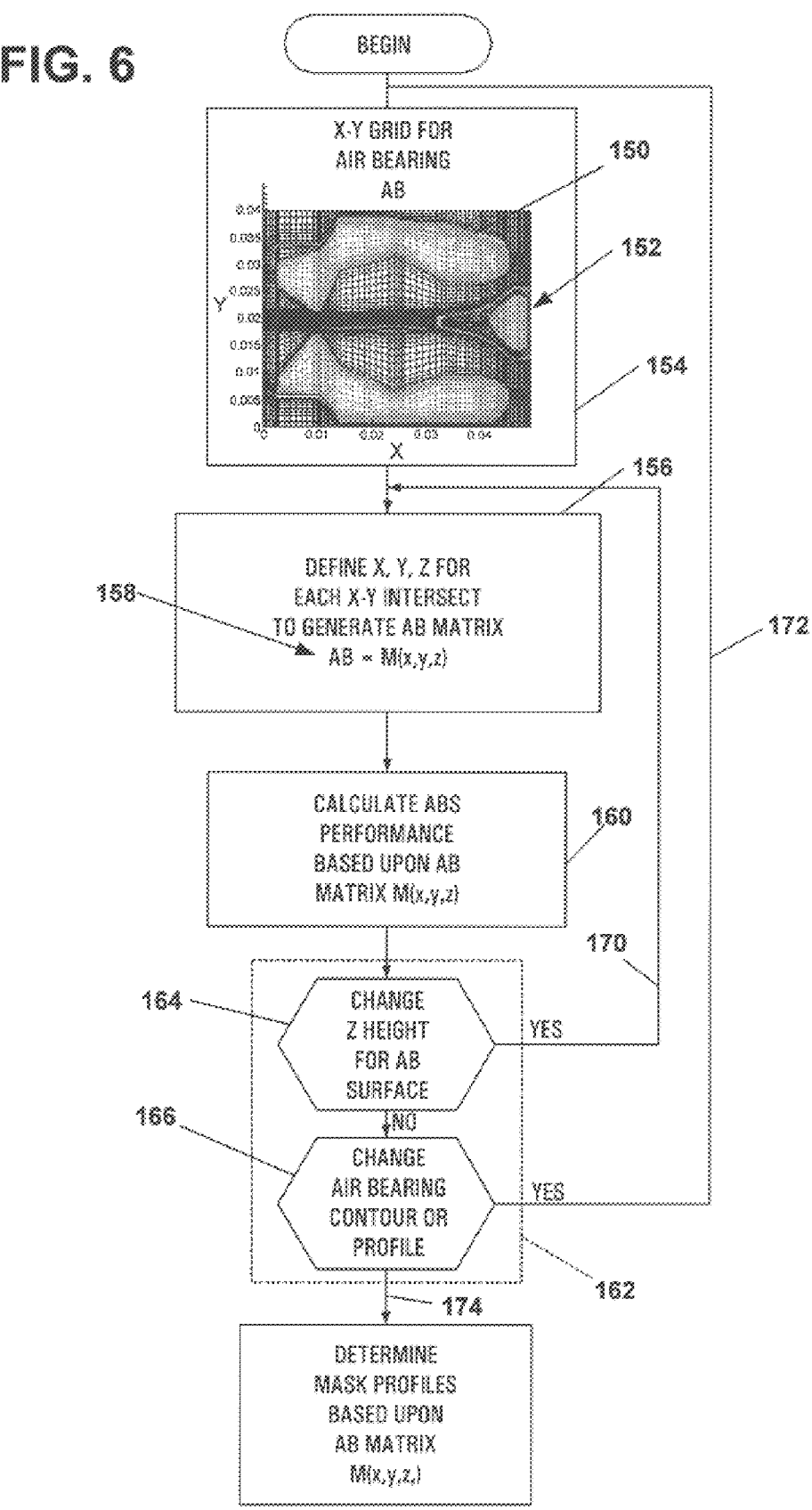
FIG. 6 is a flow chart illustrating a prior modeling system for an air bearing slider.

Fly height, pitch and roll parameters are dependent upon air bearing dimensions or design. As previously discussed areal disc drive density is increasing requiring tighter fly height and operating control. Performance of air bearing sliders is evaluated for fly height, pitch and roll characteristics using mathematical modeling techniques. As illustrated in FIG. 6, performance of a particular air bearing design is evaluated based upon a mathematical matrix definition of the raised or offset bearing surfaces of the slider. As shown in FIG. 6, for a particular air bearing design 150, an x-y matrix grid 152 is generated as illustrated by block 154. The resolution of the x-y matrix grid 152 is dependent upon the complexity or contour of the raised or offset bearing surfaces.

As illustrated in block 156, the x-y matrix grid 152 is used to create a three dimensional matrix 158 to model the air bearing design 150 or air bearing surfaces (ABS). The three dimensional matrix 158 includes a three dimensional x, y, z reference for each x-y intersect on the matrix grid 152 where z is the height dimension of the bearing surface at each x-y intersect. The three-dimensional matrix M(x, y, z) 158 is used to calculate or simulate operating performance of the air bearing design as illustrated by block 160.

Multiple design iterations may be necessary to optimize performance and design as illustrated by block 162. For example, a second design iteration can change the z dimension or height of the raised bearing surfaces as illustrated by block 164 or alternatively the profile or contour of the raised bearing surfaces can be modified as illustrated by block 166. For each design iteration, it is necessary to regenerate the three-dimensional matrix 158 and redefine each x, y, z, reference for the three-dimensional matrix M(x, y, z) for the modified bearing design. In particular, as illustrated by line 170, to change or adjust the z-dimension of the raised bearing surfaces 132, 134, the z-elevation for each of the x, y points on the bearing surface must be changed for the adjusted height elevation.

To adjust the bearing profile or contour of the raised bearing surfaces, the bearing surface must be regridded as illustrated by line 172 and the x, y, z reference for each of the regridded x-y intersects must be redefined for the modified bearing design. To reenter or redefine the x, y, z reference points for the three dimensional matrix M(x, y, z) is time consuming and extremely labor intensive. Following completion of the modeling and design process, the mask tiers or surfaces for wafer fabrication must be independently derived based upon the three-dimensional matrix design as illustrated by line 174. This requires additional manipulation of the data or matrix to create mask contours or surfaces.

Figure 7:
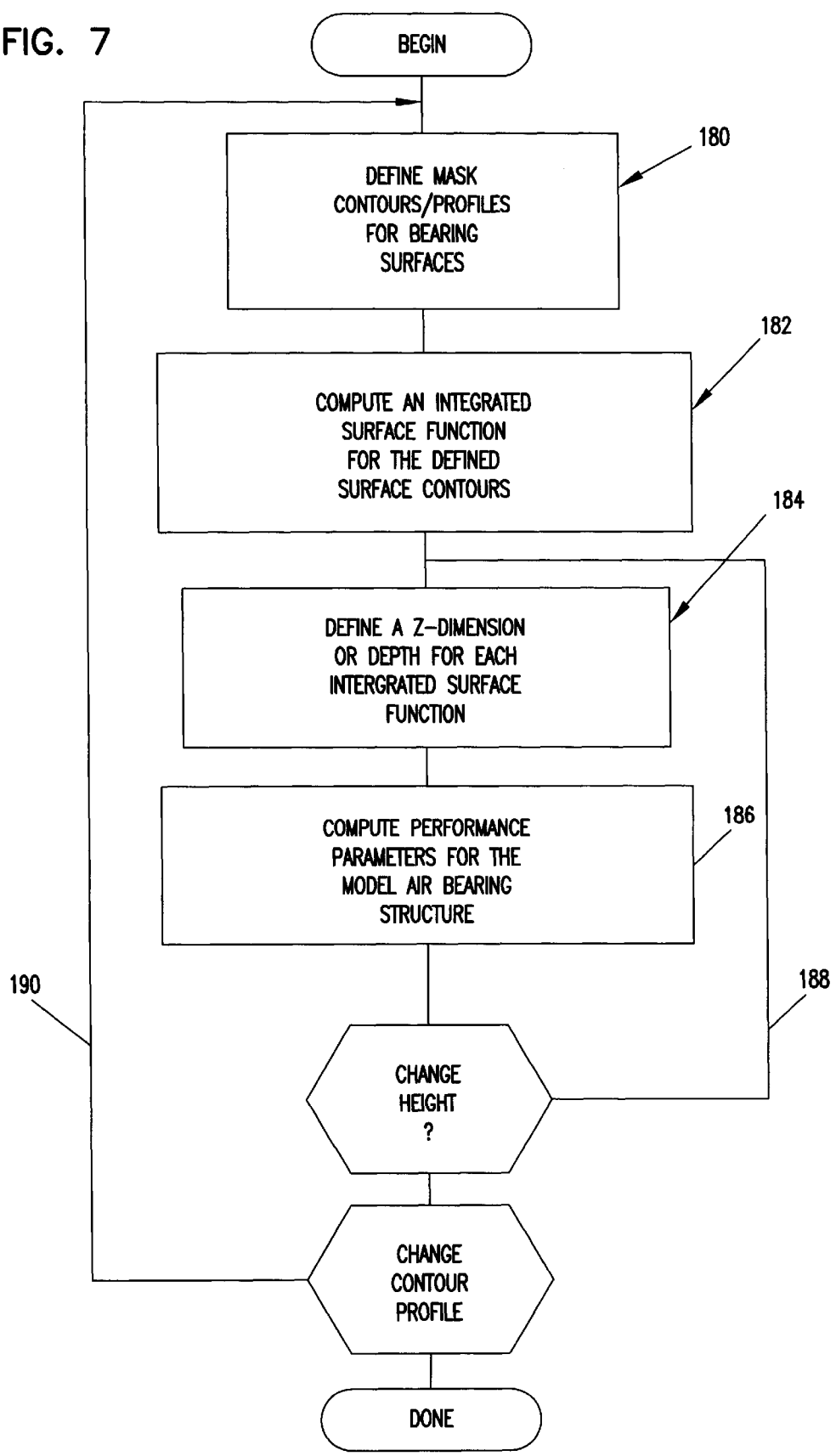
FIG. 7 is a flow chart illustrating an embodiment of a modeling system of the present invention.

The present invention relates to a flexible design and modeling process for air bearing design including independent profile mapping and height field definition. As illustrated in the flow chart of FIG. 7, the illustrated embodiment of the modeling system of the present invention includes user-defined mask contours or profiles for the raised or offset bearing surfaces of the air bearing as illustrated by block 180. The user defined profiles or contours are used to compute integrated surface functions for the mask contours to define mask surfaces as illustrated by block 182. A z-elevation or mask depth is defined for each integrated mask surface as illustrated by block 184. The computed integrated surface functions for the mask surfaces and z-elevation or mask depth dimensions therefor are used to assimilate or compile a model air bearing structure to compute performance parameters for the model air bearing structure as illustrated by block 186.

As illustrated by line 188 a modified z-dimension or depth variable can be defined to perform multiple design iterations for different bearing surface heights. The depth for each mask tier or bearing surface can be modified by changing a single depth or dimension variable for the integrated mask surfaces or mask tiers. The contour of the bearing surfaces can also be modified by modifying the mask contours as illustrated by line 190 and the system can recompute modified integrated surface functions for the modified mask contours without requiring reentry of numerous matrix parameters. Upon completion of the design process, the integrated mask surfaces or contours define mask tiers for wafer fabrication.

Figure 8:
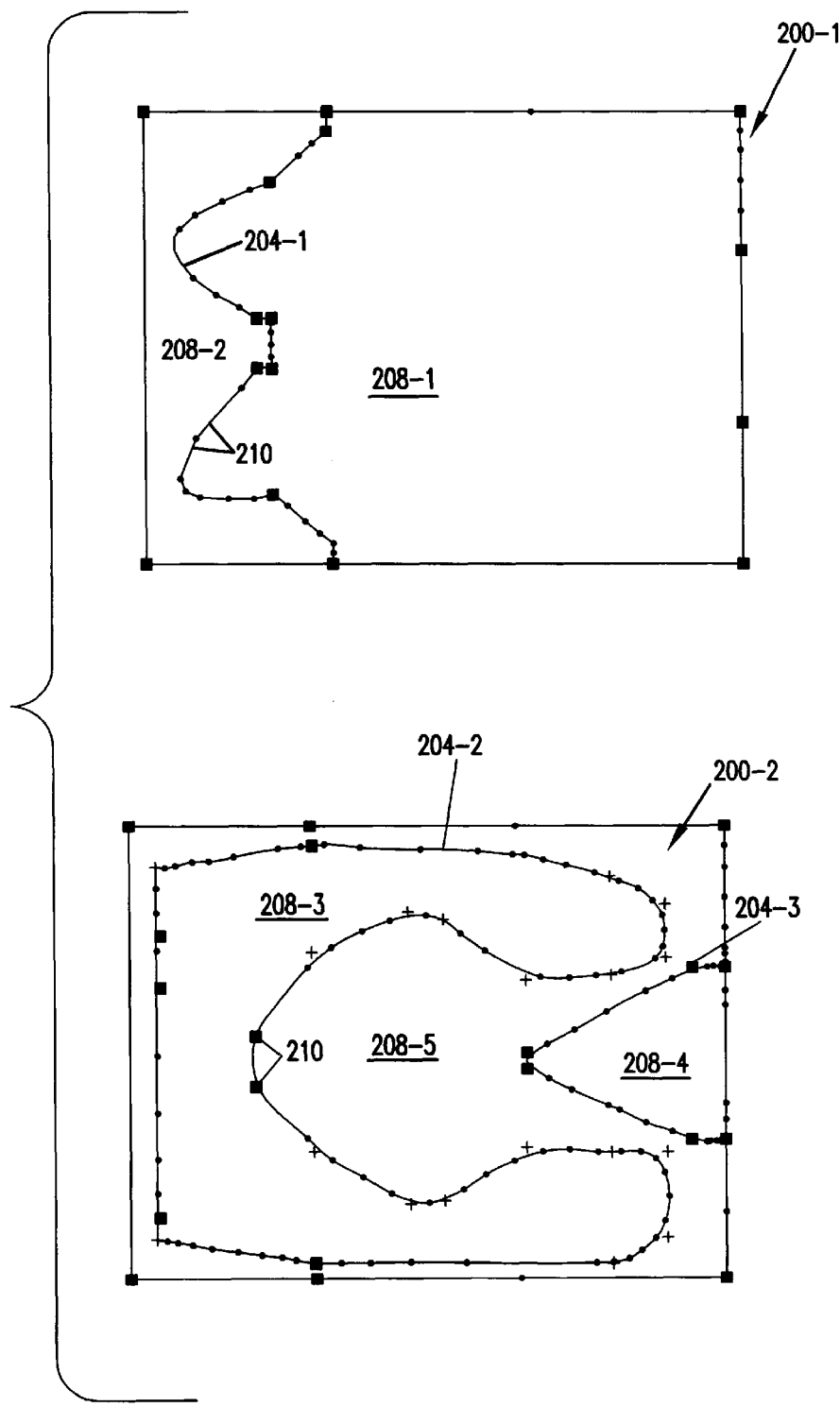
FIG. 8 illustrates mask tier profiles for multi mask tiers for a modeled air bearing structure.
Figures 1, 9:
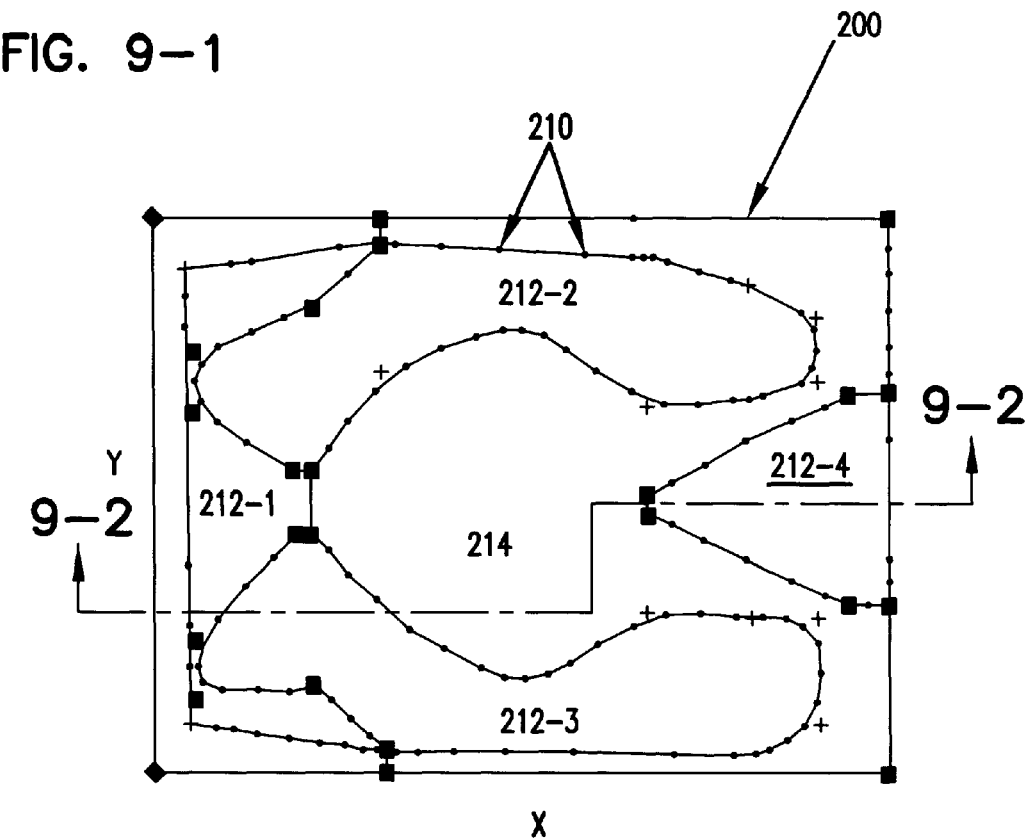
Figures 2, 9:
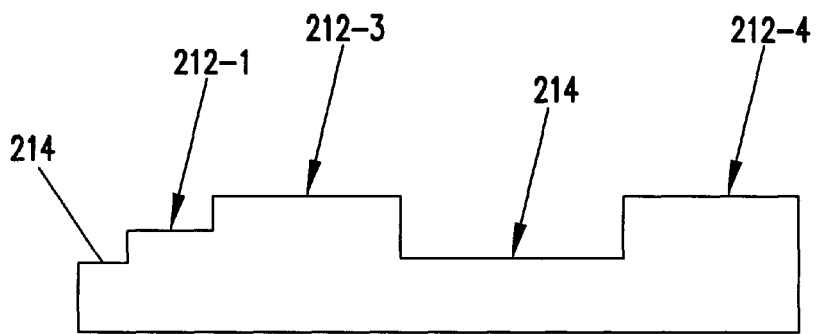

FIG. 8 illustrates multiple mask tiers 200-1, 200-2 for an air bearing model. Mask tiers 200-1, 200-2 include user definable mask profiles or contours 204-1, 204-2, 204-4. Mask tier 200-1 is defined by profile or contour 204-1 and mask tier 200-2 is defined by multiple mask profiles or contours 204-2, 204-3. In the illustrated embodiment, mask surfaces 208-1, 208-2, 208-3, 208-4, 208-5 for mask tiers 200-1, 200-2 are generated based upon the user defined mask contours 204-1, 204-2, 204-3 to form a model bearing structure including the offset or tiered bearing surfaces as illustrated in FIG. 9. In the illustrated model, contours 204 of the mask tiers 200 are defined by a plurality of contour points 210 as shown. The system computes as previously described integrated mask surfaces 208 for the user defined contours 204 as follows:

Integrated Surface (208)= ∫ Contour (204)

Figure 10:
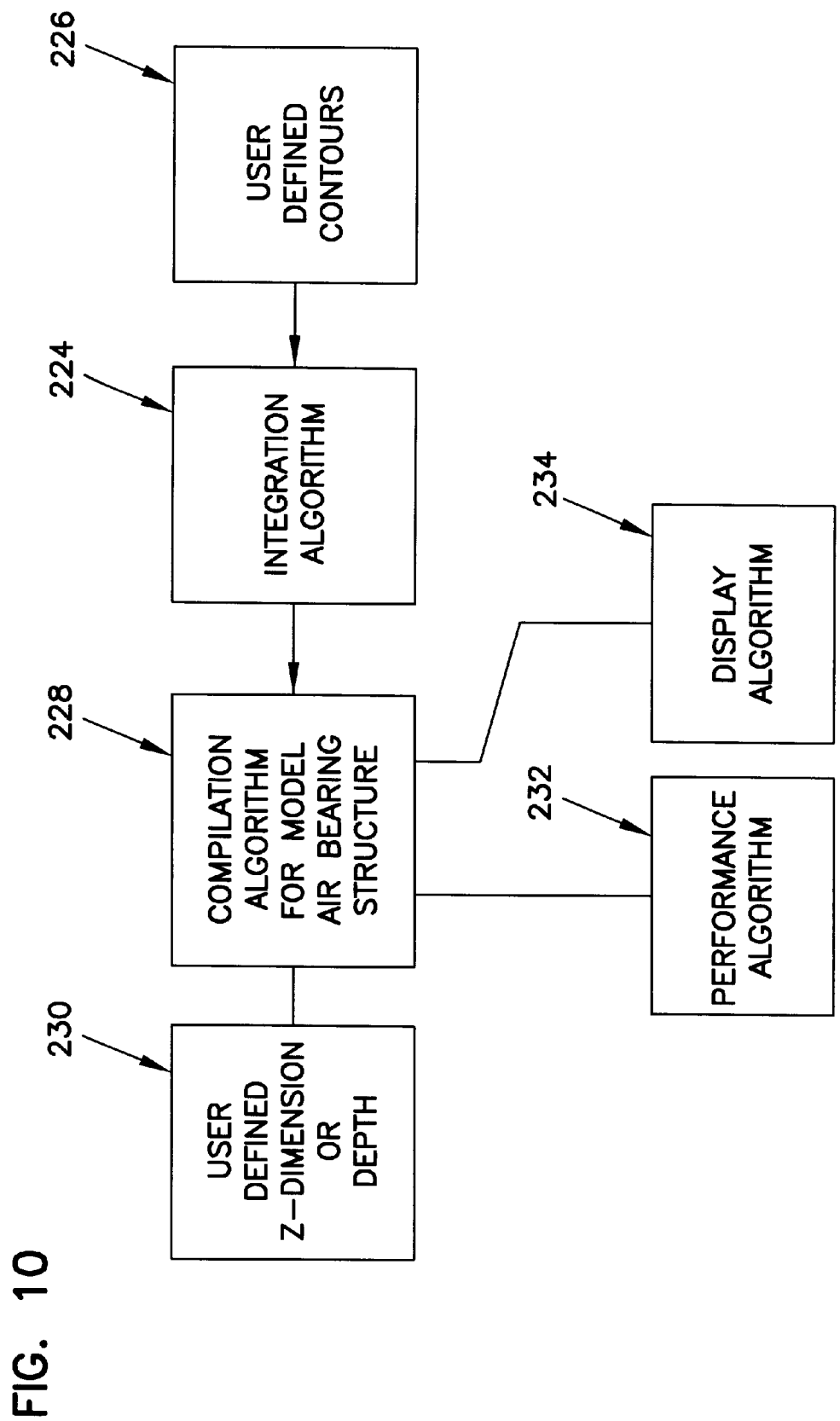
FIG. 10 illustrates an embodiment of the modeling system of the present invention.

As shown in FIGS. 9-1, 9-2, mask tier 200-1 forms a stepped bearing surface 212-1 which is offset from elevated bearing surfaces 212-2, 212-3, 212-4 and mask tier 200-1 forms the raised bearing surfaces 212-1, 212-2, 212-3, 212-4 elevated above recessed bearing surface 214. In particular, in the illustrated embodiment, surface 208-2 is etched or milled to the user defined depth to form stepped bearing surface 212-1 offset from mask surface 208-1 as illustrated in FIGS. 9-1, 9-2 and surface 208-5 is milled or etched to the user defined depth to form raised bearing surfaces 212-1, 212-2, 212-3, 212-4 as illustrated in FIGS. 9-1, 9-2 offset from mask surfaces 208-5. As previously described, a mask depth or elevation dimension is defined for the integrated surfaces 208 or mask tiers and thus the height dimensions for the modeled air bearing structure can be easily modified without extensive data reentry for multiple design iterations. Additionally, the contour or profiles for the raised bearing surfaces can be modified (e.g. based upon the contours of the mask surfaces) and the modeling system can recompute the integrated surfaces for multiple bearing structure iterations. Upon completion of the design process, the mask surfaces for the modeled structure define the mask tiers for fabrication FIG. 10 schematically illustrates architecture of a modeling system embodiment of the present invention including a computer executed integration algorithm as illustrated by block 224 for computing integrated mask surface functions for the user defined mask contours as illustrated by block 226. A bearing model as illustrated by block 228 is compiled by a computer executed compilation algorithm. The compilation algorithm compiles the multiple mask tiers as illustrated in FIG. 8 defined by the computed integrated mask surface functions and user defined mask depths for the mask surfaces as illustrated by block 230 to simulate the raised bearing surfaces 212-2, 212-3, 212-4 and offset bearing surfaces 212-1 design illustrated in FIGS. 9-1, 9-2 for a modeled bearing design.

Performance characteristics of the bearing model 228 are calculated by a performance algorithm as illustrated by block 232 for optimizing air bearing dimensions or performance. The modeled bearing 228 is graphically displayed by a display algorithm as illustrated by block 234 which generates a graphical display of the modeled air bearing structure based upon the computed integrated mask surfaces and the user defined depths therefor. Thus, as described, the modeling system of the present invention eliminates a separate process or fabrication step to determine mask profiles for the model air bearing structure since bearing surfaces for the modeled bearing design are defined based on mask surfaces or tiers.

Figure 11:
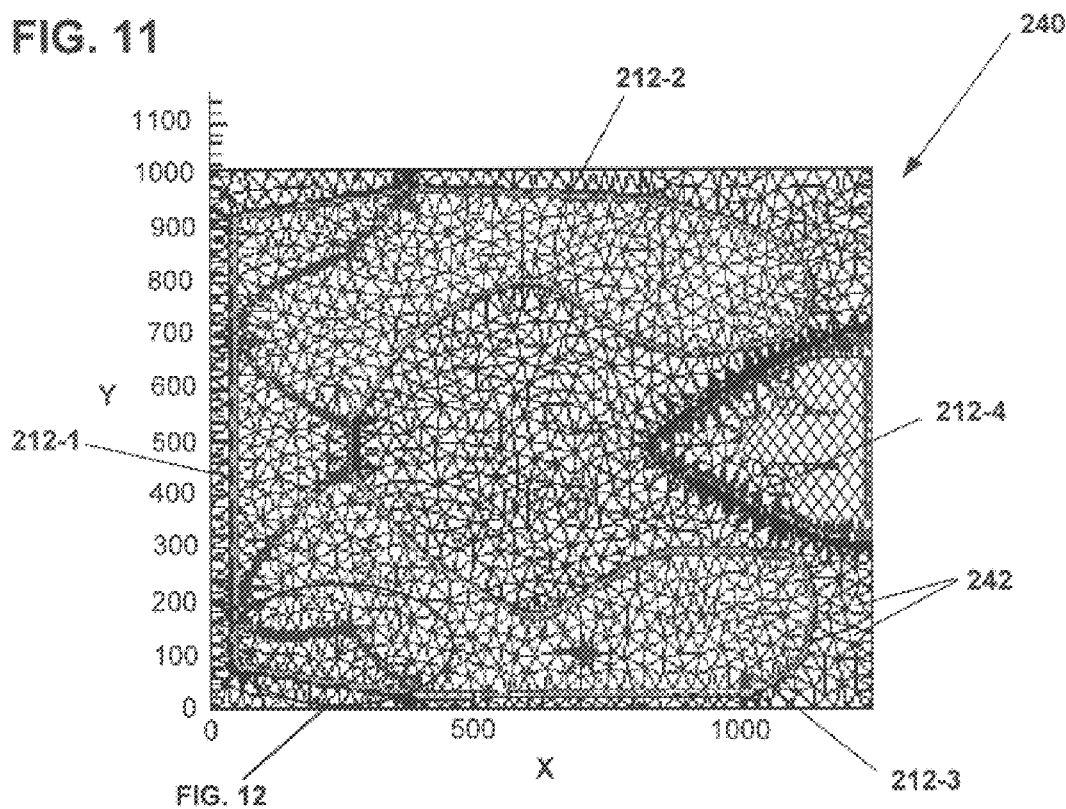
FIG. 11 is an illustration of a mesh generation for computing integrated surfaces for user defined surface contours for the modeled air bearing structure.
Figure 12:
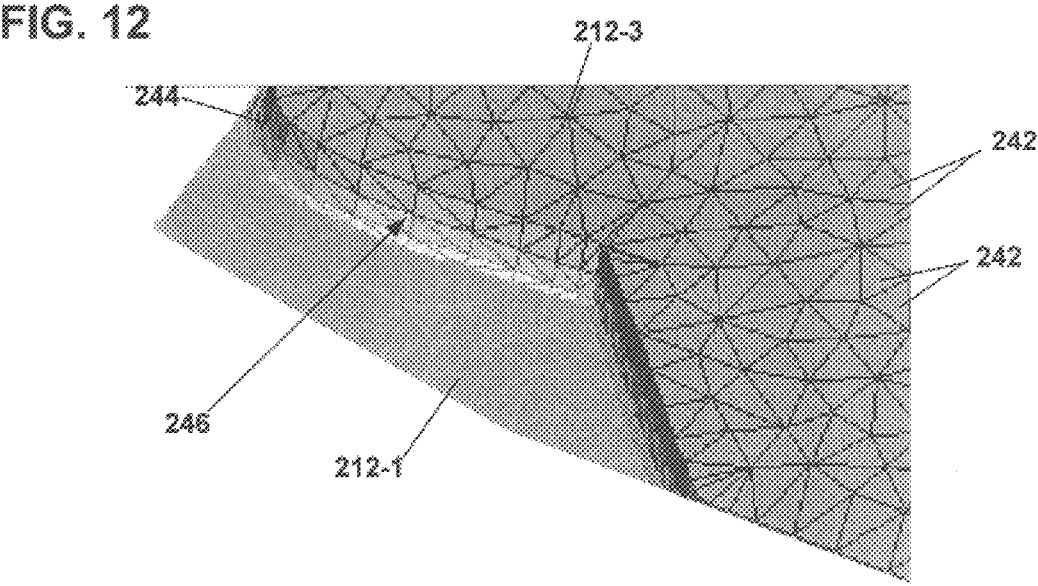
FIG. 12 is a detailed view of a portion of the integrated mesh of FIG. 11.

FIGS. 11–12 illustrate an embodiment of a mesh integration system 240 for raised bearing or mask surfaces of the air bearing slider based upon the user defined contour profiles. The illustrated mesh integration 240 uses a contour mesh of triangular surface segments 242 (as more clearly visible in FIG. 12) which cumulatively map or define the integrated surfaces 208 bounded by the user defined surface contour profiles 204 based upon:

$$\text{Mask surfaces (208)} = \sum_{1-n} \text{(Triangular Segments 242)}$$

Although a particular mesh integration system is shown, application of the present system is not limited to the specific integration or triangular segment or mesh generation shown in FIGS. 11–12. A quadrate interface profile 244 between mask tiers (shown in FIG. 12 between raised surface 212-3 and stepped surface 212-1) can also be modeled using a mesh integration 246 as shown for slider fabrication.

A system for modeling air bearing designs for heads of a data storage system. The modeling system includes user definable mask contours. The system generates integrated surface functions for the mask surfaces based upon the user defined surface contours. The system includes user definable depth or offset dimensions for each of the integrated surface functions and the integrated surface functions and depth or dimension parameter for the mask surfaces are compiled to simulate a modeled air bearing structure for performance evaluation and analysis. The mask surfaces for the modeled air bearing structure define mask tiers for slider fabrication. Thus as described, height or surface elevation is defined for each contour and not at every point that defines the contour surface as in the prior art.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to magnetic disc drive systems, it will be appreciated by those skilled in the art that the teachings of the present invention can be applied to other systems, without departing from the scope and spirit of the present invention.

What is claimed is:

1. A slider modeling system comprising:
   user definable mask surface contours for raised bearing surfaces of an air bearing;
   a mask integration algorithm to compute integrated mask surface functions for each of the user defined mask surface contours;
   a user definable mask depth dimension for the computed integrated mask surface functions; and
   a compilation algorithm to generate an air bearing structure based upon the integrated mask surface functions and the user defined mask depth dimension for the integrated mask surface functions.

2. The slider modeling system of claim 1 and further comprising:
   a display algorithm to graphically display the air bearing structure compiled from the integrated mask surface functions and the user defined mask depth dimension for each of the integrated mask surface functions.

3. The slider modeling system of claim 1 and further comprising:
   an air bearing performance program configured to compute air bearing performance parameter s based upon the air bearing structure compiled from the integrated mask surface functions and the user defined mask depth dimension for the integrated mask surface functions.

4. The slider modeling system of claim 3 wherein the air bearing performance program is configured to compute the air bearing performance parameters based upon multiple mask depth dimension iterations for the integrated mask surface functions.

5. The slider modeling system of claim 1 wherein the mask integration algorithm includes:

a mesh integration algorithm programmed to generate a mesh of integrated surface segments to map mask surfaces defined by the user defined mask surface contours.

6. The slider modeling system of claim 5 wherein the mesh integration algorithm generates an integrated triangular mesh of triangular surface segments.

7. The slider modeling system of claim 1 including user definable contour points to define the user definable mask surface contours.

8. The slider modeling system of claim 1 wherein the user definable mask contours and the user definable depth dimension define multiple mask tiers for slider fabrication.

9. A modeling system for a slider comprising:

user definable mask parameters for raised bearing surfaces of the slider; and compilation means for modeling an air bearing structure based upon the user definable mask parameters.

10. The modeling system of claim 9 wherein the user definable mask parameters include user definable mask surface contours and including an integration means for computing integrated mask surfaces based upon the user defined mask surface contours.

11. The modeling system of claim 10 wherein the integration means for computing integrated mask surfaces includes a mesh integration algorithm programmed to generate an integrated mesh of mask surface segments which cumulatively define the integrated mask surfaces.

12. A method for modeling an air bearing slider comprising steps of:

defining contour profiles for mask surfaces of a modeled air bearing structure; and generating integrated mask surface functions for each of the defined mask surface contour profiles.

13. The method of claim 12 and further comprising the step of:

defining a depth dimension for each of the integrated mask surface functions to define mask tiers for the modeled air bearing structure.

14. The method of claim 13 and further comprising the step of:

calculating performance characteristics of the modeled air bearing structure based upon the integrated mask surface functions and the depth dimension therefor.

15. The method of claim 14 and further comprising the steps of:

modifying the depth dimension for the integrated mask surface functions to define a modified model air bearing structure; and recalculating performance characteristics of the modified model air bearing structure.

16. The method of claim 14 and further comprising the steps of:

modifying mask surface contour profiles of the mask surfaces;

regenerating integrated mask surface functions for the modified mask surface contour profiles; and recalculating performance characteristics for the modified mask surface contour profiles.

17. The method of claim 12 wherein the step of generating the integrated mask surface functions for the user defined mask surface contour profiles comprises the step of:

generating a mesh integration of surface segments for the user defined mask surface profile contours.

18. A slider formed using the steps of claim 12.

19. A disc drive having a slider formed using the steps of claim 12.

20. A modeling system comprising:

user definable mask surface contours for multiple mask tiers;

mask surface integration algorithm to compute integrated mask surface functions for each of the user defined mask surface contours;

user defined mask depths for the computed integrated mask surface functions for the multiple mask tier; and compilation algorithm to define a surface structure based upon the integrated mask surface functions and the user defined mask depths therefor for the multiple mask tiers.

* * * * *

UNITED STATES PATENT AND TRADEMARK OFFICE
CERTIFICATE OF CORRECTION

PATENT NO. : 6,654,190 B2  Page 1 of 1
DATED : November 25, 2003
INVENTOR(S) : Bijoyendra Nath et al.

It is certified that error appears in the above-identified patent and that said Letters Patent is hereby corrected as shown below:

<u>Column 8,</u>
Line 41, change "tier" to -- tiers --.

Signed and Sealed this

Twenty-second Day of June, 2004

JON W. DUDAS
*Acting Director of the United States Patent and Trademark Office*